United States Patent
Qi et al.

(10) Patent No.: US 11,567,512 B1
(45) Date of Patent: Jan. 31, 2023

(54) UNMANNED AERIAL VEHICLE (UAV) TASK COOPERATION METHOD BASED ON OVERLAPPING COALITION FORMATION (OCF) GAME

(71) Applicant: Nanjing University of Aeronautics and Astronautics, Nanjing (CN)

(72) Inventors: Nan Qi, Nanjing (CN); Zanqi Huang, Nanjing (CN); Diliao Ye, Nanjing (CN); Luliang Jia, Nanjing (CN); Yueyue Su, Nanjing (CN); Kewei Wang, Nanjing (CN); Wei Wang, Nanjing (CN); Yijia Liu, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 17/579,610

(22) Filed: Jan. 20, 2022

(30) Foreign Application Priority Data

Aug. 17, 2021 (CN) .......................... 202110939975.0

(51) Int. Cl.
*B64C 39/02* (2006.01)
*G05D 1/10* (2006.01)
*H04B 7/185* (2006.01)

(52) U.S. Cl.
CPC .......... *G05D 1/104* (2013.01); *B64C 39/024* (2013.01); *H04B 7/18504* (2013.01); *B64C 2201/143* (2013.01)

(58) Field of Classification Search
CPC G05D 1/104; B64C 39/024; B64C 2201/143; H04B 7/18504
See application file for complete search history.

(56) References Cited

U.S. PATENT DOCUMENTS

| | | | |
|---|---|---|---|
| 10,484,451 B2 * | 11/2019 | Rao | ................. G06F 9/5077 |
| 10,693,950 B2 * | 6/2020 | Chen | .................. H04L 67/10 |

(Continued)

FOREIGN PATENT DOCUMENTS

| | | | |
|---|---|---|---|
| CN | 107333333 A | * | 11/2017 |
| CN | 107979846 A | | 5/2018 |

(Continued)

OTHER PUBLICATIONS

Shu Kun, et al., Technology of Self-organized Cooperative Forward Electronic Jamming By Swarm UAVs, Modern Radar, 2020, pp. 22-25, vol. 42, No. 10.

(Continued)

*Primary Examiner* — Peter D Nolan
*Assistant Examiner* — Demetra R Smith-Stewart
(74) *Attorney, Agent, or Firm* — Bayramoglu Law Offices LLC (57) ABSTRACT

An unmanned aerial vehicle (UAV) task cooperation method based on an overlapping coalition formation (OCF) game includes: constructing a sequential OCF game model for a UAV multi-task cooperation problem; using a bilateral mutual benefit transfer (BMBT) order that is biased toward the utility of a whole coalition to evaluate a preference of a UAV for a coalitional structure; optimizing task resource allocation of the UAV under an overlapping coalitional structure by using a preference gravity-guided Tabu Search algorithm to form a stable coalitional structure; and optimizing a transmission strategy based on the current coalitional structure, an updated status of a task resource allocation scheme of the UAV, and a current fading environment, so as to maximize task execution utility of a UAV network. The method quantifies characteristics of resource properties of the UAV and a task, and optimizes the task resource (Continued)

allocation of the UAV under the overlapping coalitional structure.

1 Claim, 3 Drawing Sheets

(56) References Cited

U.S. PATENT DOCUMENTS

| | | | | |
|---|---|---|---|---|
| 2013/0218469 A1* | 8/2013 | Turton | ............ | G08G 1/096844 701/533 |
| 2017/0272380 A1* | 9/2017 | Rao | ....................... | H04L 47/823 |

FOREIGN PATENT DOCUMENTS

| | | |
|---|---|---|
| CN | 110062017 A | 7/2019 |
| CN | 112020021 A | 12/2020 |
| CN | 113037876 A | 6/2021 |
| EP | 3681202 A1 | 7/2020 |
| EP | 3751901 A1 | 12/2020 |
| WO | 2018072224 A1 | 4/2018 |
| WO | 2020223667 A1 | 11/2020 |

OTHER PUBLICATIONS

Jiaxin Chen, et al., Joint Task Assignment and Spectrum Allocation in Heterogeneous UAV Communication Networks: A Coalition Formation Game-Theoretic Approach, IEEE Transactions on Wireless Communications, 2021, pp. 440-452, vol. 20, No. 1.

Gui Hai-Xia, et al., An algorithm for overlapping coalition structure generation based on differential evolution and encoding repairs, Control Theory & Applications, 2018, pp. 215-223, vol. 35, No. 2.

Heyu Luan, et al., Energy Efficient Task Cooperation for Multi-UAV Networks: A Coalition Formation Game Approach, IEEE Access, 2020, pp. 149372-149384, vol. 8.

Du Ji-Yong, et al., Overlapping Coalition Generation Using Improved Continuous Particle Swarm Optimization, 2013, pp. 1918-1923, vol. 12, No. 47.

Dadmehr Rahbari, et al., Fast and Fair Computation Offloading Management in a Swarm of Drones Using a Rating-Based Federated Learning Approach, IEEE Access, 2021, pp. 113832-113849, vol. 9.

Gui Haixia, et al., Payoff Distribution Strategy of Overlapping Coalitions for Concurrent Multiple Tasks, PR & AI, 2016, pp. 332-340, vol. 29, No. 4.

Fatemeh Afghah, et al., A Coalition Formation Approach to Coordinated Task Allocation in Heterogeneous UAV Networks, 2018 Annual American Control Conference (ACC), 2018, pp. 5968-5975.

Alia Asheralieva, et al., Hierarchical Game-Theoretic and Reinforcement Learning Framework for Computational Offloading in UAV-Enabled Mobile Edge Computing Networks With Multiple Service Providers, IEEE Internet of Things Journal, 2019, pp. 8753-8769, vol. 6, No. 5.

* cited by examiner

UNMANNED AERIAL VEHICLE (UAV) TASK COOPERATION METHOD BASED ON OVERLAPPING COALITION FORMATION (OCF) GAME

CROSS REFERENCE TO THE RELATED APPLICATIONS

This application is based upon and claims priority to Chinese Patent Application No. 202110939975.0, filed on Aug. 17, 2021, the entire contents of which are incorporated herein by reference.

TECHNICAL FIELD

The present invention relates to the technical field of wireless communication, and specifically, to an unmanned aerial vehicle (UAV) task cooperation method based on an overlapping coalition formation (OCF) game.

BACKGROUND

With the rapid development of aerospace and wireless communication systems, UAVs have been developed to perform various, large-scale and complex tasks such as combats in the battlefield, search and rescue under disaster circumstances, reconnaissance and monitoring, emergency charging, and many other fields due to their versatility, cost-efficient, and intrinsic mobility. However, with the limited capabilities (i.e., limited on-board energy and payload, and limited communication resources) of a single UAV, the UAVs often cannot have enough required resources to accomplish these tasks separately. In order to overcome the capacity constraints of a single UAV, a plurality of UAVs can form swarms to perform tasks efficiently in a multi-UAV network.

Important research was performed and investigated a cooperative task assignment scenario that the UAVs form swarms and then each swarm select one task to perform under non-overlapping coalition formation (CF) game, where the coalition formation aim to complete the assigned tasks as soon as possible under resource constraints. J. Chen proposed coalition selection and spectrum allocation through joint optimization to study task allocation in the multi-UAV network in his research work in 2021 (reference: J. Chen, Q. Wu, Y. Xu, N. Qi, X. Guan, Y. Zhang, and Z. Xue, "Joint task assignment and spectrum allocation in heterogeneous UAV communication networks: A coalition formation game-theoretic approach," *IEEE Transactions on Wireless Communications*, vol. 20, no. 1, pp. 440-452, 2021). F. Afghah, M proposed a CF game model based on reputation scheduling to ensure reliable cooperation between UAVs when there are some self-interest UAVs in a network (reference: Afghah, M. Zaeri-Amirani, A. Razi, J. Chakareski, and E. Bentley, "A coalition formation approach to coordinated task allocation in heterogeneous UAV networks" in 2018 *Annual American Control Conference (ACC)*, 2018, pp. 5968-5975).

However, existing UAV task cooperation methods based on a CF game have the following problems: (1) Most of the existing UAV task cooperation methods only consider a mode in which each UAV coalition executes one task. However, the UAVs actually may allocate their resource to a plurality of task points and cooperatively execute the plurality of task points based on a sequential task execution schedule. (2) Most of the existing UAV task cooperation methods only focus on completion of a task, but ignore costs of executing the task by a UAV coalition, such as a flight loss, a time cost, and so on. (3) Recent advancements in the UAV technology allow a UAV to carry diverse devices and resources, such that the UAV has a variety of capabilities. Therefore, it is necessary to distinguish properties of resources required by different types of tasks in more detail.

SUMMARY

To overcome the above shortcomings in the prior art, the present invention provides a UAV task cooperation method based on an OCF game. Cooperative task resource allocation is performed for a heterogeneous multi-UAV network based on an overlapping coalition game model and a sequential task execution mechanism. Compared with an existing non-overlapping coalition formation game model, the overlapping coalition game method proposed in the present invention enables a UAV to make a more flexible resource allocation decision, so as to improve task execution utility.

To achieve the above objective, the present invention adopts the following technical solution:

A UAV task cooperation method based on an OCF game includes:

step 1: considering an overlapping and complementary relationship between resource properties of a UAV and a task and a task priority, quantifying characteristics of the resource properties of the UAV and the task, optimizing task resource allocation of the UAV under an overlapping coalitional structure, and constructing a sequential OCF game model for a UAV multi-task cooperation problem;

step 2: using a bilateral mutual benefit transfer (BMBT) order that is biased toward utility of a whole coalition to evaluate a preference of the UAV for the coalitional structure, such that all coalition members cooperate with each other to achieve mutual benefits and further improve total task execution utility of a whole network;

step 3: optimizing the task resource allocation of the UAV under the overlapping coalitional structure by using a preference gravity-guided Tabu Search algorithm based on a preference relationship between the UAV and tasks with a same type of resource to form a stable coalitional structure; and step 4: optimizing a transmission strategy based on the current coalitional structure, an updated status of a task resource allocation scheme of the UAV, and a current fading environment, so as to maximize the task execution utility of the UAV network.

To optimize the above technical solution, a specific measure further includes the following content:

The quantifying characteristics of the resource properties of the UAV and the task in step 1 is specifically as follows:

a cluster network consisting of N heterogeneous UAVs is considered, where a set of the UAVs is expressed as $N=\{1, \ldots n \ldots, N\}$, the UAVs need to complete M tasks randomly distributed in the network, a set of the tasks is expressed as $M=\{1, \ldots m \ldots, M\}$, and the UAVs need to consume corresponding task resources to complete the tasks;

it is assumed that there are Z types of task resources, where a set of sub-task types is $T=\{TB_1, \ldots, TB_{z_k}, \ldots, TC_{z_c}, \ldots, TC_Z\}$, TB represents a consumable resource required to execute a type of task, and TC represents a non-consumable resource required to execute this type of task;

the UAVs executing the tasks in the network are heterogeneous, in other words, the UAVs are equipped with different types and quantities of resources, which are defined as $B_n=\{b_n^{(1)}, \ldots, b_n^{(z_b)}, \ldots, \mu_n^{(z_c)}, \ldots, \mu_n^{(Z)}\}$, $b_n^{(z_b)}, \mu_n^{(z_c)} \geq 0$, indicating a vector of a resource carried by each UAV to execute each task, where $b_n^{(z_b)}$ represents a type and a quantity of consumable resources; $\mu_n^{(z_c)}$ is defined as a non-consumable communication capacity resource; and a required vector of a resource required by an $m^{th}$ task is defined as $B_n = \{b_n^{(1)}, \ldots, b_n^{(z_b)}, \ldots, \mu_n^{(z_c)}, \ldots, \mu_n^{(Z)}\}$, $b_n^{(z_b)}$, $\mu_n^{(z_c)} \geq 0$, indicating a type and a quantity of resources required to execute a task in one target region, where $l_m^{(z_b)}$ and $I_m^{(z_c)}$ represent types and quantities of consumable and non-consumable resources required to execute one task respectively;

a task execution priority of each region is different, and a priority set is defined as $\beta = \{\beta_1, \ldots, \beta_m, \ldots, \beta_M\}$; and a set of resources allocated by each UAV to the $m^{th}$ task point is defined as $A_m = \{A_m^{(1)}, \ldots, A_m^{(n)}, \ldots, A_m^{(N)}\}$, where $A_m^{(n)}$ represents a quantity of resources allocated by a UAV n to the $m^{th}$ task point, and is expressed as $A_m^n = \{\tau_{n,m}^{(1)}, \ldots, \tau_{n,m}^{(z_b)}, \ldots, \varepsilon_{n,m}^{(z_c)}, \ldots, \varepsilon_{n,m}^{(Z)}\}$;

for a consumable task, $\tau_{n,m}^{(z_b)}$ represents a quantity of a $z_b^{th}$ type of consumable resource allocated by the UAV n to the $m^{th}$ task point, and a constraint $$\sum_{m \in M} \tau_{n,m}^{(z_b)} \leq b_n^{(z_b)}$$

is satisfied, in other words, a total quantity of allocated resources cannot exceed a quantity of resources carried by the UAV;

for a non-consumable task, $\varepsilon_{n,m}^{(z_c)}$ represents a $z_c^{th}$ non-consumable communication capacity resource allocated by the UAV n to the $m^{th}$ task point, where when the UAV n joins a corresponding task point coalition, the UAV moves to a position of the task point and transmits data by using a maximum communication capacity; and $Mem(A_m)$ is defined as a coalition member set of UAVs that allocate resources to the $m^{th}$ task point, and is expressed as $Mem(A_m) = \{n \in N | A_m^{(n)} \neq \emptyset\}$.

The optimizing task resource allocation of the UAV under an overlapping coalitional structure in step 1 is specifically as follows:

a satisfaction function is introduced to measure a satisfaction degree of the task, where a utility function of the $m^{th}$ task point is expressed as follows:

$$U_m(\mathcal{A}_m) = \frac{1}{1 + \exp^{-\beta_m \left(C_m - C_m^{(req)} + \omega / \beta_m\right)}}$$

where $C_m^{(req)}$ represents a service completion requirement of the task point, and) $C_m(A_m)$ represents a service revenue of the task point, which comprehensively considers a task completion status and an energy loss and is defined as follows:

$$C_m(A_m) = D + \omega_1 r(A_m) - \omega_2 t_m^{(wait)} - \omega_3 \sum_{n \in Mem(A_m)} e_m^{(n)}$$

where D represents a constant to ensure that $C_m > 0$; $\omega_1$, $\omega_2$, and $\omega_3$ are weight coefficients to evaluate proportions of impact of a task revenue, waiting time, and UAV energy consumption on the network utility; $r(A_m)$ represents a completion degree of the $m^{th}$ task point; $t_m^{(wait)}$ represents waiting time of the $m^{th}$ task point; and $e_m^{(n)}$ represents a flight loss of the UAV n for task execution at the $m^{th}$ task point, which is calculated based on a proportion of a quantity of resources allocated by the UAV to the task point to a total quantity of resources allocated to the task point, and is expressed as follows:

$$e_m^{(n)} = \frac{E_n |A_m^{(n)}|}{\sum_{m \in M} |A_m^{(n)}|}$$

where $E_n$ represents total propulsion energy consumption of the UAV n.

A method for calculating the completion degree of the $m^{th}$ task point includes:

defining an average task completion degree $r(A_m)$ of the $m^{th}$ task point as follows:

$$r(A_m) = \frac{\sum_{z_b \in TB, l_m^{(z_b)} \neq 0} \frac{\lambda_m^{(z_b)}}{l_m^{(z_b)}} + \sum_{z_c \in TC, \xi_m^{(z_c)} \neq 0} \frac{\sigma_m^{(z_c)}}{\xi_m^{(z_c)}}}{|res_m|}$$

where $$\frac{\lambda_m^{(z_b)}}{l_m^{(z_b)}}$$

and $$\frac{\sigma_m^{(z_c)}}{\xi_m^{(z_c)}}$$

represent proportions of allocated consumable and non-consumable resources to a resource demand of the $m^{th}$ task point respectively, $$\lambda_m^{(z_b)} = \sum_{n \in Mem(\mathcal{A}_m)} \tau_{n,m}^{(z_b)}$$

represents a total quantity of the $z_b^{th}$ type of resource allocated by the UAV to the $m^{th}$ task point, $$\sigma_m^{(z_c)} = \sum_{n \in Mem(\mathcal{A}_m)} \varepsilon_{n,m}^{(z_c)}$$

represents a total quantity of the $z_c^{th}$ type of communication resource allocated by the UAV to the $m^{th}$ task point, $\xi_m^{(z_c)}$ represents a quantity of the $z_c^{th}$ type of communication resource required by the $m^{th}$ task point, $\|\cdot\|$ represents a size of the set, and $res_m$ represents a set of resource types required by the $m^{th}$ task point and is expressed as follows:

$$res_m = \{T_{2_b}, T_{2_c} \in T | l_m^{(z_b)}, I_m^{(z_c)} \in L_m, l_m^{(z_b)}, I_m^{(z_c)} \neq 0\},$$

A method for calculating the waiting time of the $m^{th}$ task point is as follows:

time consumed by the UAV n for task execution is decomposed into total flight duration $t_n^{(fly)}$ in and total hovering duration $t_n^{(hover)}$;

the UAV sorts, based on task priorities, task points to which resources are allocated, and generates a task execution sequence, such that a position sequence of the tasks executed by the UAV n is obtained based on the current coalitional structure, namely, $\text{Task}_n^{(UAV)} = \{\text{task}_n^{(1)}, \ldots, \text{task}_n^{(i)}, \ldots, \text{task}_n^{(\zeta)}\}$, $\text{task}_n^{(i)} \in M$, where $\zeta$ represents a length of the task execution sequence;

in a task execution process, because each UAV has a different position status and flight path, resulting in inconsistent time of arriving at a task position, and task start time of each coalition is determined by a UAV that arrives last, $t_{\text{task}_n^{(i)}, \text{task}_n^{(i+1)}}^{(fly)}$ is defined as flight duration of the UAV from a task point $\text{task}_n^{(i)}$ to a task point $\text{task}_n^{(i+1)}$, and a flight speed of the UAV n between the task points is set as $v_{\text{task}_n^{(i)}, \text{task}_n^{(i+1)}}^{(fly)}$, which is determined by the UAV that arrives last;

assuming that the UAV n arriving at the task point $\text{task}_n^{(i+1)}$ last moves from a previous task point to a next task point at a maximum speed $v_n^{(max)}$, time consumed by the UAV is $$t_{\text{task}_n^{(i)}, \text{task}_n^{(i+1)}}^{(fly)} = \frac{d_{\text{task}_n^{(i)}, \text{task}_n^{(i+1)}}}{v_n^{(max)}},$$

where $d_{\text{task}_n^{(i)}, \text{task}_n^{(i+1)}}$ represents a distance between the task points, other UAVs adjust their flight speeds $v_{\text{task}_n^{(i)}, \text{task}_n^{(i+1)}}^{(fly)}$ to ensure that all UAVs participating in a task at the task point $\text{task}_n^{(i+1)}$ arrive at the same time, and therefore, the total flight duration of the UAV is expressed as follows:

$$t_n^{fly} = \begin{cases} t_{loc_n, \text{task}_n^{(i)}}^{(fly)}, & \text{if } \zeta = 1; \\ t_{loc_n, \text{task}_n^{(i)}}^{(fly)} + \sum_{i=1}^{\zeta-1} t_{\text{task}_n^{(i)}, \text{task}_n^{(i+1)}}^{(fly)}, & \text{else} \end{cases}.$$

where $loc_n$ represents an initial position of the UAV n;

task execution duration of the UAV at the $m^{th}$ task point is defined as $t_m^{(hover)} = t_m^{(com)} + t_m^{(tran)}$, where $t_m^{(com)}$ and $t_m^{(tran)}$ represent duration of executing the consumable task and the non-consumable task by the UAV respectively;

based on total communication capacity $\sigma_m^{(z_c)}$ of the $z_c^{th}$ type of sub-task resource, $t_m^{(com)}$ is defined as follows:

$$t_m^{(tran)} = \max\left\{\frac{I_m^{(1)}}{\sigma_m^{(1)}}, \ldots, \frac{I_m^{(z_c)}}{\sigma_m^{(z_c)}}\right\}, \sigma_m^{(z_c)} \neq 0$$

in conclusion, the total hovering duration of the UAV n is obtained according to the following formula:

$$t_n^{(hover)} = \sum_{i=1}^{|\text{Task}_n^{(UAV)}|} t_{\text{task}_n^{(i)}}^{(hover)};$$

and after the sorting by task priority, an execution sequence before the $m^{th}$ task point is defined as follows:

$\text{Task}_m^{(point)} = \{\text{task}_m^{(i)}, \ldots, \text{task}_m^{(j)}, \ldots, \text{task}_m^{(J)}\}$, $\text{task}_m^{(j)} \in M, \text{task}_m^{(J)} = m$ where J represents a length of the task execution sequence before the $m^{th}$ task point, and therefore, the waiting time of the $m^{th}$ task point is defined as follows:

$$t_m^{(wait)} = \begin{cases} t_{loc_n, \text{task}_m^{(1)}}^{(fly)}, & J = 1; \\ t_{loc_n, \text{task}_m^{(1)}}^{(fly)} + \sum_{j=1}^{J-1} t_{\text{task}_m^{(j)}, \text{task}_m^{(j+1)}}^{(fly)} + \sum_{j=1}^{J-1} t_{\text{task}_m^{(j)}}^{(hover)}, & \text{Others} \end{cases}$$

A formula for calculating the total propulsion energy consumption of the UAV n is as follows:

Flight energy consumption of the UAV: Because propulsion energy consumption is far greater than communication energy consumption, communication energy consumption is usually ignored compared with propulsion energy consumption. Therefore, when a speed of the UAV is V, propulsion power of the UAV is expressed as follows:

$$P(V) = P_0\left(1 + \frac{3V^2}{U_{tip}^2}\right) + P_1\left(\sqrt{1 + \frac{V^4}{4v_0^4}} - \frac{V^2}{2v_0^2}\right)^{1/2} + \frac{1}{2}f_0\rho s_0\eta V^3$$

where $P_0$ and $P_1$ represent blade profile power and induced power in a hovering state respectively, $U_{tip}$ and $v_0$ represent a tip speed of a rotor and a mean rotor velocity in the hovering state respectively, $f_0$ and $\eta$ represent a fuselage drag ratio and rotor solidity respectively, and $\rho$ and $s_0$ represent air density and disc area of the rotor respectively; and therefore, the total propulsion energy consumption of the UAV is as follows:

$$E_n = \sum_{i=1}^{\zeta} P(0) t_{\text{task}_n^{(i)}}^{(hover)} + P\left(V_{loc_n, \text{task}_n^{(i)}}^{(fly)}\right) t_{loc_n, \text{task}_n^{(i)}}^{(fly)} + \sum_{i=1}^{\zeta-1} P\left(V_{\text{task}_n^{(i)}, \text{task}_n^{(i+1)}}^{(fly)}\right) t_{\text{task}_n^{(i)}, \text{task}_n^{(i+1)}}^{(fly)}$$

When a remaining fuel capacity of the UAV reaches a threshold, the UAV has to exit task allocation and return. Therefore, navigation of the UAV needs to satisfy the following energy constraint:

$E_n \leq E_n^{(threshold)}, n \in N$

In step 1, the task resource allocation of the UAV under the overlapping coalitional structure is optimized to maximize the utility of the whole network by forming a better overlapping coalitional structure for resource allocation. Therefore, an optimization formula is as follows:

$$\begin{aligned}
\underset{SC}{\text{maximize}} \quad & \sum_{m \in M} U_m(\mathcal{A}_m), \\
\text{s.t.} \quad & |\mathcal{A}_m| \neq \emptyset, m \in \mathcal{M}, \\
& E_n \leq E_n^{(threshold)}, n \in \mathcal{N} \\
& \sum_{m \in \mathcal{M}} \tau_{n,m}^{(z_b)} \leq b_n^{(z_b)}, n \in \mathcal{N}, m \in \mathcal{M} \\
& \varepsilon_{n,m}^{(z_c)} = 0 \text{ or } \mu_n^{(z_c)}, n \in \mathcal{N}, m \in \mathcal{M}
\end{aligned}$$

In step 1, the sequential OCF game model is constructed for the UAV multi-task cooperation problem. In the sequential OCF game model, the UAV serves as a player and is assumed to allocate a resource and form an overlapping coalition to cooperatively complete the task. Therefore, a quantity of coalitions is equal to a quantity of tasks.

A task cooperation model based on the OCF game is defined as $\wp = \{N, U_m, SC, X\}$, where N represents a UAV player; $U_m$ represents a utility function of a task point coalition m; $SC=\{A_1, \ldots, A_m\}$, $Mem(A_m) \in N$ represents the overlapping coalitional structure; $Mem(A_m)$ represents the coalition member set of the UAVs that allocate the resources to the $m^{th}$ task point and is expressed as $Mem(A_m)=\{n \in N | A_m^{(n)} \neq \emptyset\}$; and $X=\{x_1, \ldots, x_n, \ldots, x_N\}$ represents a UAV decision-making vector for determining the task resource allocation, and a resource allocation vector of each UAV is defined as $X_n=[A_1^{(n)}, \ldots, A_m^{(n)}, \ldots, A_M^{(n)}]$.

In addition, each UAV gets a share of a revenue from a coalition that the UAV joins, a revenue sharing problem is resolved according to basic proportional fairness of a Shapley value, and utility of the UAV n is expressed as follows:

$$u_n = \sum_{m \in M} \upsilon_n^{(m)} U_m(\mathcal{A}_m)$$

where $\upsilon_n^{(m)}$ represents a proportion of UAV resource allocation for the task point coalition m to guarantee that a utility back deserved by the UAV from the coalition increases as the task resources of the UAV allocated to the coalition increases and is expressed as follows:

$$\upsilon_n^{(m)} = \frac{O_n^{(m)}}{\sum_{n \in Mem(A_m)} O_n^{(m)}}$$

where $O_n^{(m)}$ represents an amount of resources allocation of the UAV n to the task point coalition m, and is expressed as follows:

$$O_n^{(m)} = \sum_{\tau_{n,m}^{(z_b)}, \varepsilon_{n,m}^{(z_c)} \in \mathcal{A}_m^{(n)}} \left( \left| \tau_{n,m}^{(z_b)} \right| + \left| \varepsilon_{n,m}^{(z_c)} \right| \right).$$

In the sequential OCF game model in step 1, for a UAV player n, two coalitional structures $SC_Q$ and $SC_P$ are provided, and the coalitional structure $SC_Q$ is superior to the coalitional structure $SC_P$, which is expressed as $SC_Q \succ_n SC_P$;

$SC_Q \succ_n SC_P$ indicates that the UAV player n prefers to allocate the task resources by using the coalitional structure $SC_Q$ instead of the coalitional structure $SC_P$;

a coalitional structure $SC_P = \{A_1^{(p)}, \ldots, A_m^{(p)}\}$ is considered, where for some resources $\delta_n^{(z_b)}$ of the UAV player n, $|\delta_n^{(z_b)}| \leq |\tau_n^{(z_b)}|$ is satisfied;

a switch operation is defined as an action of moving some consumable resources from a coalition $A_i^{(p)}$ to a coalition $A_j^{(p)}$ to generate a new coalitional structure $SC_Q = SC_P \setminus \{A_i^{(p)}, A_j^{(p)}\} \cup \{A_i^{(q)}, A_j^{(q)}\}$, where $A_i^{(q)} = A_j^{(p)} \setminus \{\delta_n^{(z_b)}\}$ and $A_j^{(q)} = A_j^{(p)} \cup \{\delta_n^{(z_b)}\}$; and for a non-consumable resource $\mu_n^{(z_c)}$, the switch operation is defined as an action of leaving or joining the coalition $A_i^{(p)}$ to generate a new coalitional structure $SC_Q = SC_P \setminus \{A_i^{(p)}\} \cup \{A_i^{(q)}\}$, where $A_i^{(q)} = A_i^{(p)} \setminus \{\mu_n^{(z_c)}\}$ or $A_j^{(p)} \cup \{\mu_n^{(z_c)}\}$, and the two coalitional structures obtained after the switch operation need to satisfy a preference decision, namely, $SC_Q \succ_n SC_P$.

The BMBT order in step 2 is specifically as follows:

for any UAV $n \in N$ and any two coalitional structures $SC_P$ and $SC_Q$ that are generated through a switch operation, where $A(n) = \{A_n \in SC | A_m^{(n)} \neq \emptyset, m \in M\}$ represents a set of other task point coalitions to which the UAV n allocates resources, $$SC_Q \succ_n SC_P \Leftrightarrow$$
$$u_n(SC_Q) + \sum_{g \in Mem(\mathcal{A}_j)\setminus\{n\}} [u_g(SC_Q) - u_g(SC_P)] + \sum_{o \in Mem(\mathcal{A}(n))\setminus\{n\}} u_o(SC_Q) >$$
$$u_n(SC_P) + \sum_{h \in Mem(\mathcal{A}_j)\setminus\{n\}} [u_h(SC_P) - u_h(SC_Q)] + \sum_{o \in Mem(\mathcal{A}(n))\setminus\{n\}} u_o(SC_P);$$

and when the UAV n performs a resource switch operation, a proposed preference decision indicates that total coalitional utility containing utility of the UAV n and utility of a resource transfer coalition is greater than that before resource transfer; and when this condition is satisfied, the switch operation is successful; otherwise, the switch operation fails.

The step of optimizing the task resource allocation of the UAV under the overlapping coalitional structure by using the preference gravity-guided Tabu Search algorithm based on the preference relationship between the UAV and tasks with the same type of resource to form the stable coalitional structure in step 3 specifically includes:

defining a resource allocation vector of the UAV n for the task point m in a $k^{th}$ iteration as $A_m^{(n)} = \{\tau_{n,m}^{(1)}(k), \ldots, \tau_{n,m}^{(z_b)}(k), \ldots, \varepsilon_{n,m}^{(z_c)}(k), \ldots, \varepsilon_{n,m}^{(Z)}(k)\}$, and obtaining a coalitional structure $SC^{(k)} = \{A_1^{(k)}, \ldots, A_m^{(k)}\}$ under resource allocation in the $k^{th}$ iteration;

establishing a Tabu list $Tabu_{SC} = \{SC^{(k-L_{tabu})}, \ldots, SC^{(k-1)}\}$ based on resource allocation under a historical coalitional structure, where $L_{tabu}$ represents a Tabu length, indicating existence time of the coalitional structure in the Tabu list;

introducing a concept of preference gravity based on tasks of remaining unallocated resources and UAVs of remaining unused resources, and defining a vector of a remaining resource required by the task point m as $L_m^{(less)}(k) = \{Le_m^{(1)}(k), \ldots, Le_m^{(z_b)}(k), \ldots, Re_m^{(z_c)}(k), \ldots, Re_m^{(Z)}(k)\}$, where $Le_m^{(z_b)}(k)$ and $Re_m^{(z_c)}(k)$ are expressed as follows:

$$Le_m^{(z_b)}(k) = \max\left\{0, l_m^{(z_b)} - \sum_{n \in N} \tau_{n,m}^{(z_b)}(k)\right\}$$

$$Re_m^{(z_c)}(k) = \max\left\{0, \xi_m^{(z_c)} - \sum_{n \in N} \varepsilon_{n,m}^{(z_c)}(k)\right\}$$

where $Le_m^{(z_b)}(k)$ and $Re_m^{(z_c)}(k)$ vary with a UAV resource allocation decision;

defining the preference gravity as a degree of preference between the remaining resource required by the task point and a remaining resource carried by the UAV;

defining a preference gravity vector of a $z^{th}$ type of resource of the UAV n for each task as follows:

$F_n^{(z)}(k) = [f_{1,n}^{(z)}(k), \ldots, f_{m,n}^{(z)}(k)]$, where $f_{m,n}^{(z)}(k)$ represents preference gravity for the $m^{th}$ task point and is expressed as follows:

$$f_{m,n}^{(z)}(k) = \begin{cases} \dfrac{(\beta_m)^2 Le_m^{(z_b)}(k) \delta_n^{(z_b)}}{d_{m,n}}, & \text{when } z = z_b; \text{ and} \\ \dfrac{(\beta_m)^2 Re_m^{(z_c)}(k) \mu_n^{(z_c)}}{d_{m,n}}, & \text{when } z = z_c; \end{cases}$$

and defining a probability vector of the $z^{th}$ type of resource $\delta_n^{(z)}$ of the UAV n for being allocated to each task, namely, $P_n^{(z)}(k)=[p_{n,1}^{(z)}(k), \ldots, p_{m,n}^{(z)}(k), \ldots, p_{n,M}^{(z)}(k)]$, where a corresponding expression is as follows:

$$p_{m,n}^{(z)}(k) = \frac{\exp[f_{m,n}^{(z)}(k)\Gamma(k)]}{\sum_{m \in M} \exp[f_{m,n}^{(z)}(k)\Gamma(k)]}.$$

where $\Gamma(k)$ represents a Boltzmann coefficient; the UAV performs a switch operation according to a selection probability established based on the preference gravity; and if proposed priority is satisfied, the UAV performs a switch operation of resource allocation to improve the total task execution utility of the network; otherwise, the UAV maintains the original coalitional structure under the resource allocation.

Step 3 specifically includes the following substeps:

a) initialization: setting a quantity k of iterations to 0, namely k=0, denoting a coalitional structure under resource allocation in each iteration as $SC^{(k)}=\{A_1^{(k)}, \ldots, A_m^{(k)}\}$, establishing a Tabu list $Tabu_{SC}=\{SC^{(k-L_{tabu})}, \ldots, SC^{(k-1)}\}$, initializing the Tabu list to empty, and setting a Tabu length as $L_{tabu}$; inputting a remaining initially-carried resource $L_m^{(less)}(0)$ to obtain $F_n^{(s)}(0)$ and $P_m^{(z)}(0)$; and allocating an initially carried resource of the UAV to each task point based on $P_n^{(z)}(0)$, and performing step b), step c), and step d) cyclically;

b) setting k=k+1, updating a vector $L_m^{(less)}(k)$ and the Tabu list $Tabu_{SC}$ based on a coalitional structure $SC^{(k-1)}$, and updating a Boltzmann coefficient according to a rule $\Gamma(k+1)=\Gamma(k)+k(\Gamma_{max}-\Gamma(k))/K_{max}$;

c) randomly selecting some consumable UAV resources $\delta_n^{(z_b)}$ or non-consumable resources $\mu_n^{(z_c)}$, inputting $\delta_n^{(z_b)}$ or $\mu_n^{(z_c)}$, and $L_m^{(less)}(k)$ into a preference gravity expression to obtain $P_n^{(z)}(k)$; and performing, by the UAV n, a switch operation based on the vector $P_n^{(z)}(k)$, where a coalitional structure obtained after the switch operation is $SC_{switch}^{(k)}$; and if the new coalitional structure $SC_{switch}^{(k)}$ is different from any one in the Tabu list $Tabu_{SC}$, performing step d), otherwise, performing step b);

d) updating, by the UAV n, the coalitional structure according to the following order:

$$SC^{(k)} = \begin{cases} SC_{swicth}^{(k)}, & \text{if } SC_{swicth}^{(k)} \succ_n SC^{(k-1)} \\ SC^{(k-1)}, & \text{else} \end{cases};$$

and e) ending the process when the utility is still not improved after $K_{stable}$ iterations are performed or a total quantity of iterations reaches $K_{max}$, to obtain a final convergence structure $SC^{(*)}$.

The present invention has the following beneficial effects:

To resolve the cooperative task allocation and resource allocation problems in the heterogeneous UAV network, the present invention proposes the sequential OCF game model for the first time, to quantify the characteristics of the resource properties of the UAV and the task, and optimize the task resource allocation of the UAV under the overlapping coalitional structure. The present invention designs the BMBT order that is different from a traditional preference order and biased toward the utility of the whole coalition, such that all the coalition members cooperate with each other to achieve mutual benefits and further improve the total task execution utility of the whole network. The present invention proves existence of the stable coalitional structure under the proposed BMBT order by using a potential energy game. Finally, the present invention proposes the preference gravity-guided Tabu Search algorithm based on the preference relationship between the UAV and the tasks with the same type of resource, to form the stable coalitional structure. The preference gravity-guided Tabu Search algorithm improves convergence and utility compared with other similar algorithms.

DETAILED DESCRIPTION OF THE EMBODIMENTS

The embodiments of the present invention are further described in detail below with reference to the accompanying drawings.

Figure 2:
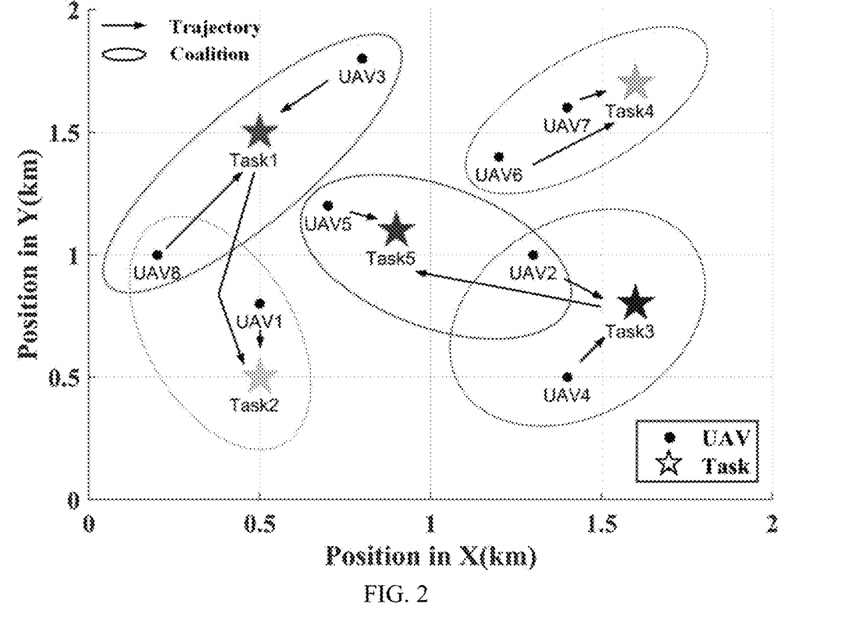
FIG. 2 shows a scenario of a heterogeneous UAV network based a task-driven overlapping coalition.

The embodiments are established based on a system model shown in FIG. 2. FIG. 2 shows a scenario of a heterogeneous UAV network based on a task-driven overlapping coalition. The current network includes eight UAVs and five task points in total, and labels of different shapes are used to represent the UAVs, the task points, and corresponding resources. A circle represents a UAV and a five-pointed star represents a task point. Without loss of generality, initial position vectors and resource vectors of all the UAVs and task points are randomly and uniformly generated in a current delimited region.

Figure 1:
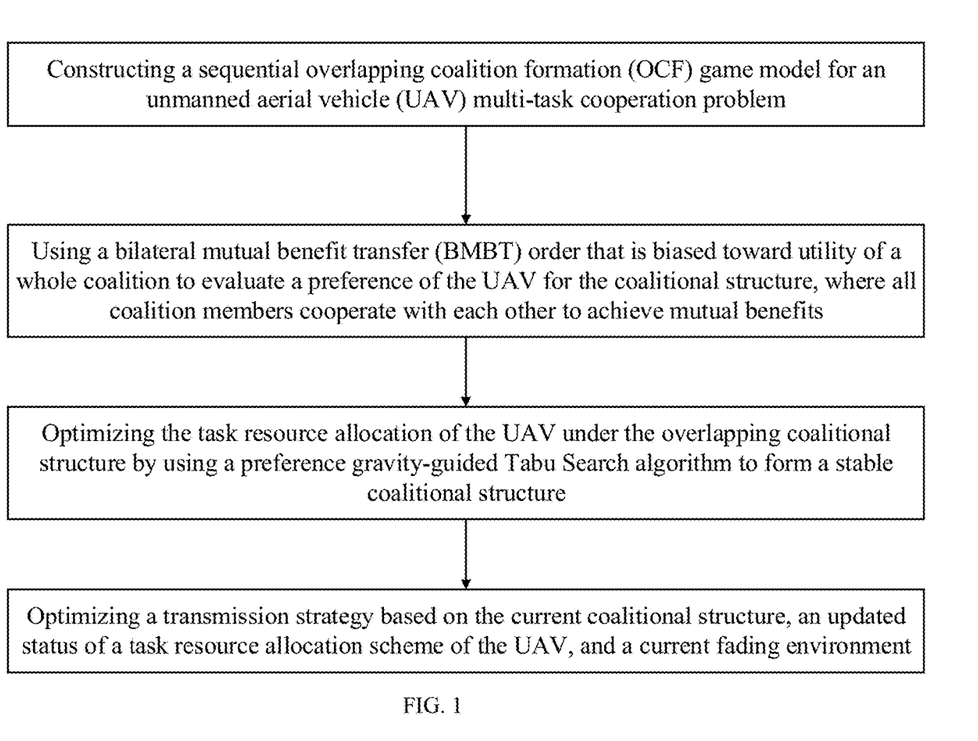
FIG. 1 is a flowchart of a method according to the present invention.

As shown in FIG. 1, specific implementation steps of the present invention are as follows:

Step 1: Consider an overlapping and complementary relationship between resource properties of a UAV and a task and a task priority, quantify characteristics of the resource properties of the UAV and the task, optimize task resource allocation of the UAV under an overlapping coalitional structure, and construct a sequential OCF game model for a UAV multi-task cooperation problem.

(1) The quantifying characteristics of the resource properties of the UAV and the task is specifically as follows:

A cluster network consisting of N heterogeneous UAVs is considered, where a set of the UAVs is expressed as N={1, ... n ..., N}. The UAVs need to complete M tasks randomly distributed in the network, and a set of the tasks is expressed as M={1, ... m ..., M}. It is assumed that there are Z types of task resources. A set of sub-task types is T={$TB_1, \ldots, TB_{z_b}, \ldots, TC_{z_c}, \ldots, TC_Z$}, where TB represents a consumable resource required to execute a type of task, and TC represents a non-consumable resource required to execute this type of task. The UAVs executing the tasks in the network are heterogeneous, in other words, the UAVs are equipped with different types and quantities of resources, which are defined as $B_n=\{b_n^{(1)}, \ldots, b_n^{(z_b)}, \ldots, \mu_n^{(z_c)}, \ldots, \mu_n^{(Z)}\}$, indicating a vector of a resource carried by each UAV to execute each task. $b_n^{(z_b)}$ represents a type and a quantity of consumable resources, for example, fire rescue materials and battery capacities, and $\mu_n^{(z_c)}$ is defined as a non-consumable communication capacity resource. A required vector of a resource required by an $m^{th}$ task is defined as $L_m=\{l_m^{(1)}, \ldots, l_m^{(z_b)}, \ldots, I_m^{(z_c)}, \ldots, I_m^{(Z)}\}$, $l_m^{(z_b)}$, $I_m^{(z_c)} \geq 0$, indicating a type and a quantity of resources required to execute a task in one target region. $l_m^{(z_b)}$ and $I_m^{(z_c)}$ represent types and quantities of consumable and non-consumable resources required to execute one task respectively. A task execution priority of each region is different, and a priority set is defined as $\beta=\{\beta_1, \ldots, \beta_m, \ldots, \beta_M\}$. A set of resources allocated by each UAV to an $m^{th}$ task point is defined as $A_m=\{A_m^{(1)}, \ldots, A_m^{(n)}, \ldots, A_m^{(N)}\}$, where $A_m^{(n)}$ represents a quantity of resources allocated by a UAV n to the $m^{th}$ task point, and is expressed as $A_m^n = \{\tau_{n,m}^{(1)}, \ldots, \tau_{n,m}^{(z_b)}, \ldots, \varepsilon_{n,m}^{(z_c)}, \ldots, \varepsilon_{n,m}^{(Z)}\}$. Mem($A_m$) is defined as a coalition member set of UAVs that allocate resources to the $m^{th}$ task point, and is expressed as Mem $(A_m) = \{n \in N | A_m^{(n)} \neq \emptyset\}$.

(2) The optimizing task resource allocation of the UAV under an overlapping coalitional structure is specifically as follows:

A satisfaction function is introduced to measure a satisfaction degree of the task. A utility function of the $m^{th}$ task point may be expressed as follows:

$$U_m(\mathcal{A}_m) = \frac{1}{1 + \exp^{-\beta_m(C_m - C_m^{(req)} + \omega/\beta_m)}}$$

where $C_m^{(req)}$ represents a service completion requirement of the task point, and $C_m(A_m)$ represents a service revenue of the task point, which comprehensively considers a task completion status and an energy loss and is defined as follows:

$$C_m(\mathcal{A}_m) = D + \omega_1 r(\mathcal{A}_m) - \omega_2 t_m^{(wait)} - \omega_3 \sum_{n \in Mem(\mathcal{A}_m)} e_m^{(n)}$$

where D represents a constant to ensure that $C_m > 0$; $\omega_1$, $\omega_2$, and $\omega_3$ are weight coefficients to evaluate proportions of impact of a task revenue, waiting time, and UAV energy consumption on network utility; $r(A_m)$ represents a completion degree of the $m^{th}$ task point; $t_m^{(wait)}$ represents waiting time of the $m^{th}$ task point; and $e_m^{(n)}$ represents a flight loss of the UAV n for task execution at the $m^{th}$ task point, which is calculated based on a proportion of a quantity of resources allocated by the UAV to the task point to a total quantity of resources allocated to the task point, and is expressed as follows:

$$e_m^{(n)} = \frac{E_n |A_m^{(n)}|}{\sum_{m \in M} |A_m^{(n)}|}$$

where $E_n$ represents total propulsion energy consumption of the UAV n. These performance indicators are defined as follows:

1) Task completion degree: In a resource allocation process of the UAV, quality and a quantity of completed task types need to be considered. The task completion degree represents a proportion of a resource actually allocated to the $m^{th}$ task point to a resource demand of the task point. When a total quantity of resources allocated by a UAV coalition exceeds the demand of the task point, the task completion degree reaches 100%. Otherwise, the task completion degree is less than 100%. An average task completion degree $r(A_m)$ of the $m^{th}$ task point is defined as follows:

$$r(\mathcal{A}_m) = \frac{\sum_{z_b \in TB, l_m^{(z_b)} \neq 0} \frac{\lambda_m^{(z_b)}}{l_m^{(z_b)}} + \sum_{z_c \in TC, \xi_m^{(z_c)} \neq 0} \frac{\sigma_m^{(z_c)}}{\xi_m^{(z_c)}}}{|res_m|},$$

where $$\frac{\lambda_m^{(z_b)}}{l_m^{(z_b)}}$$

and $$\frac{\sigma_m^{(z_c)}}{\xi_m^{(z_c)}}$$

represent proportions of allocated consumable and non-consumable resources to the resource demand of the $m^{th}$ task point respectively, $$\lambda_m^{(z_b)} = \sum_{n \in Mem(\mathcal{A}_m)} \tau_{n,m}^{(z_b)}$$

represents a total quantity of a $z_b^{th}$ type of resource allocated by the UAV to the $m^{th}$ task point, $$\sigma_m^{(z_c)} = \sum_{n \in Mem(\mathcal{A}_m)} \varepsilon_{n,m}^{(z_c)}$$

represents a total quantity of a $z_c^{th}$ type of communication resource allocated by the UAV to the $m^{th}$ task point, $\xi_m^{(z_c)}$ represents a quantity of the $z_c^{th}$ type of communication resource required by the $m^{th}$ task point, $\|$ represents a size of the set, and re $res_m$ represents a set of resource types required by the $m^{th}$ task point and is expressed as follows: $res_m = \{T_{z_b}, T_{z_c} \in T | l_m^{(z_b)}, I_m^{(z_c)} \in L_m, l_m^{(z_b)}, l_m^{(z_c)} \neq 0\}$.

2) Waiting time of the task: Time consumed by the UAV n for task execution is decomposed into total flight duration $t_n^{(fly)}$ and total hovering duration $t_n^{(hover)}$. The UAV sorts, based on task priorities, task points to which resources are allocated, and generates a task execution sequence, such that a position sequence of the tasks executed by the UAV n is obtained based on the current coalitional structure, namely, $Task_n^{(UAV)} = \{task_n^{(1)}, \ldots, task_n^{(i)}, \ldots, task_n^{(\zeta)}\}$, $task_n^{(i)} \in M$, where $\zeta$ represents a length of the task execution sequence. In a task execution process, because each UAV has a different position status and flight path, resulting in inconsistent time of arriving at a task position, and task start time of each coalition is determined by a UAV that arrives last, $t_{task_n^{(i)}, task_n^{(i+1)}}^{(fly)}$ is defined as flight duration of the UAV from a task point $task_n^{(i)}$ to a task point $task_n^{(i+1)}$, and a flight speed of the UAV n between the task points is set as $v_{task_n^{(i)},task_n^{(i+1)}}^{(fly)}$, which is determined by the UAV that arrives last. Assuming that the UAV n arriving at the task point $task_n^{(i+1)}$ last moves from a previous task point to a next task point at a maximum speed $v_n^{(max)}$, time consumed by the UAV is $$t_{task_n^{(i)},task_n^{(i+1)}}^{(fly)} = \frac{d_{task_n^{(i)},task_n^{(i+1)}}}{v_n^{(max)}},$$

where $d_{task_n^{(i)},task_n^{(i+1)}}$ represents a distance between the task points. Other UAVs adjust their flight speeds $v_{task_n^{(i)},task_n^{(i+1)}}^{(fly)}$ to ensure that all UAVs participating in a task at the task point $task_n^{(i+1)}$ arrive at the same time. Therefore, the total flight duration of the UAV is expressed as follows:

$$t_n^{fly} = \begin{cases} t_{loc_n,task_n^{(i)}}^{fly} & \text{if } \zeta = 1; \\ t_{loc_n,task_n^{(1)}}^{(fly)} + \sum_{i=1}^{\zeta-1} t_{task_n^{(i)},task_n^{(i+1)}}^{(fly)}, & \text{else.} \end{cases}$$

where $loc_n$ represents an initial position of the UAV n; task execution duration (roughly about the hovering duration of the AUV) of the UAV at the $m^{th}$ task point is defined as $t_m^{(hover)}=t_m^{(com)}+t_m^{(tran)}$, where $t_m^{(com)}$ and $t_m^{(tran)}$ represent duration of executing a consumable task and a non-consumable task by the UAV respectively; and based on total communication capacity $\sigma_m^{(z_c)}$ of the $z_c^{th}$ type of sub-task resource, $t_m^{(com)}$ is defined as follows:

$$t_m^{(tran)} = \max\left\{\frac{I_m^{(1)}}{\sigma_m^{(1)}}, \ldots, \frac{I_m^{(z_c)}}{\sigma_m^{(z_c)}}\right\}, \sigma_m^{(z_c)} \neq 0$$

In conclusion, the total hovering duration of the UAV n is obtained according to the following formula:

$$t_n^{(hover)} = \sum_{i=1}^{|Task_n^{(UAV)}|} t_{task_n^{(i)}}^{(hover)}$$

After the sorting by task priority, an execution sequence before the $m^{th}$ task point is defined as follows:

$Task_m^{(point)}=\{task_m^{(1)}, \ldots, task_m^{(j)}, \ldots, task_m^{(J)}\}$, $task_m^{(j)} \in M, task_m^{(J)} = m$ where J represents a length of the task execution sequence before the $m^{th}$ task point, and the waiting time of the $m^{th}$ task point is defined as follows:

$$t_m^{(wait)} = \begin{cases} t_{loc_n,task_m^{(1)}}^{(fly)}, \\ t_{loc_n,task_m^{(1)}}^{(fly)} + \sum_{j=1}^{J-1} t_{task_m^{(j)},task_m^{(j+1)}}^{(fly)} + & J = 1; \\ \sum_{j=1}^{J-1} t_{task_m^{(j)}}^{(hover)}, & \text{Others} \end{cases}$$

3) Flight energy consumption of the UAV: Because propulsion energy consumption is far greater than communication energy consumption, communication power consumption is usually ignored compared with the propulsion power consumption. Therefore, when a speed of the UAV is V, propulsion power of the UAV is expressed as follows:

$$P(V) = P_0\left(1 + \frac{3V^2}{U_{tip}^2}\right) + P_1\left(\sqrt{1 + \frac{V^4}{4v_0^4}} - \frac{V^2}{2v_0^2}\right)^{1/2} + \frac{1}{2}f_0\rho s_0\eta V^3$$

where $P_0$ and $P_1$ represent blade profile power and induced power in a hovering state respectively, $U_{tip}$ and $v_0$ represent a tip speed of a rotor and a mean rotor velocity in the hovering state respectively, $f_0$ and $\eta$ represent a fuselage drag ratio and rotor solidity respectively, and $\rho$ and $s_0$ represent air density and disc area of the rotor respectively; and therefore, the total propulsion energy consumption of the UAV is as follows:

$$E_n = \sum_{i=1}^{\zeta} P(0) t_{task_n^{(i)}}^{(hover)} + P\left(V_{loc_n,task_n^{(i)}}^{(fly)}\right) t_{loc_n,task_n^{(i)}}^{(fly)} + \sum_{i=1}^{\zeta-1} P\left(V_{task_n^{(i)},task_n^{(i+1)}}^{(fly)}\right) t_{task_n^{(i)},task_n^{(i+1)}}^{(fly)}.$$

In addition, the consumable resources carried by the UAV are limited. After the consumable resources are exhausted, only the non-consumable task can be performed. Furthermore, fuel oil carried by the UAV is also limited. When a remaining fuel capacity of the UAV reaches a threshold, the UAV has to exit task allocation and return. Therefore, navigation of the UAV needs to satisfy the following energy constraint:

$E_n \leq E_n^{(threshold)}, n \in N.$

In conclusion, network optimization is performed to maximize the utility of the whole network by forming a better overlapping coalitional structure for resource allocation. Therefore, an optimization formula is as follows:

$$\begin{aligned} \underset{SC}{\text{maximize}} \quad & \sum_{m \in M} U_m(\mathcal{A}_m), \\ \text{s.t.} \quad & |\mathcal{A}_m| \neq \emptyset, m \in M, \\ & E_n \leq E_n^{(threshold)}, n \in N \\ & \sum_{m \in M} \tau_{n,m}^{(z_b)} \leq b_n^{(z_b)}, n \in N, m \in M \\ & \varepsilon_{n,m}^{(z_c)} = 0 \text{ or } \mu_n^{(z_c)}, n \in N, m \in M \end{aligned}$$

(3) A task resource allocation problem of a heterogeneous coalition-based UAV network is modeled as an overlapping coalition game model with transferable utility. In the model, the UAV acts as a player. Assuming that the UAV allocates a resource and forms an overlapping coalition to cooperatively complete the task, a quantity of coalitions is equal to a quantity of tasks. A task cooperation model based on the OCF game is defined as $\wp = \{N, U_m, SC, X\}$, where N represents a UAV player; $U_m$ represents a utility function of a task point coalition m; $SC=\{A_1, \ldots, A_m\}$, $Mem(A_m) \in N$ represents the overlapping coalitional structure; $Mem(A_m)$ represents the coalition member set of the UAVs that allocate the resources to the $m^{th}$ task point and is expressed as $Mem(A_m)=\{n \in N | A_m^{(n)} \neq \emptyset\}$; and $X=\{x_1, \ldots, x_n, \ldots, x_N\}$ represents a UAV decision-making vector for determining the task resource allocation, and a resource allocation vector of each UAV is defined as $X_n=[A_1^{(n)}, \ldots, A_m^{(n)}, \ldots, A_M^{(n)}]$.

In addition, each UAV gets a share of a revenue from a coalition that the UAV joins, and a revenue sharing problem is resolved according to basic proportional fairness of a Shapley value. Utility of the UAV n may be expressed as follows:

$$u_n = \sum_{m \in M} \upsilon_n^{(m)} U_m(\mathcal{A}_m)$$

where $\upsilon_n^{(m)}$ represents a proportion of UAV resource allocation for the task point coalition m to guarantee that a utility back deserved by the UAV from the coalition increases as the task resources of the UAV allocated to the coalition increases. A corresponding expression is as follows:

$$\upsilon_n^{(m)} = \frac{O_n^{(m)}}{\sum_{n \in Mem(A_m)} O_n^{(m)}}$$

where $O_n^m$ represents an amount of resources allocation of the UAV n to the task point coalition m, and is expressed as follows:

$$O_n^{(m)} = \sum_{\tau_{n,m}^{(z_b)}, \varepsilon_{n,m}^{(z_c)} \in \mathcal{A}_m^{(n)}} \left( |\tau_{n,m}^{(z_b)}| + |\varepsilon_{n,m}^{(z_c)}| \right).$$

Two coalitional structures $SC_Q$ and $SC_P$ are provided, and the coalitional structure $SC_Q$ is superior to the coalitional structure $SC_P$ which is expressed as $SC_Q \succ_n SC_P$. $SC_Q \succ_n SC_P$ indicates that the UAV player n prefers to allocate the task resources by using the coalitional structure $SC_Q$ instead of the coalitional structure $SC_P$. A coalitional structure $SC_P = \{A_1^{(p)}, \ldots, A_m^{(p)}\}$ is considered. For some resources $\delta_n^{(z_b)}$ of the UAV player n, which satisfy a condition $|\delta_n^{(z_b)}| \le |\tau_n^{(z_b)}|$, a switch operation is defined as an action of moving some consumable resources from a coalition $A_i^{(p)}$ to a coalition $A_j^{(p)}$ to generate a new coalitional structure $SC_Q = SC_P \setminus \{A_i^{(p)}, A_j^{(p)}\} \cup \{A_i^{(q)}, A_j^{(q)}\}$, where $A_i^{(q)} = A_i^{(p)} \setminus \{\delta_n^{(z_b)}\}$ and $A_j^{(q)} = A_j^{(p)} \cup \{\delta_n^{(z_b)}\}$.

For a non-consumable resource $\mu_n^{(z_c)}$, the switch operation is defined as an action of leaving or joining the coalition $A_i^{(p)}$ to generate a new coalitional structure $SC_Q = SC_P \setminus \{A_i^{(p)}\} \cup \{A_i^{(q)}\}$, where $A_i^{(q)} = A_i^{(p)} \setminus \{\mu_n^{(z_c)}\}$ or $A_j^{(p)} \cup \{\mu_n^{(z_c)}\}$. The two coalitional structures obtained after the switch operation need to satisfy a preference decision, namely, $SC_Q \succ_n SC_P$.

Step 2: Propose a BMBT order to evaluate preferences of the UAV n for the two coalitional structures, to avoid falling into local optimization and create more total network utility.

The BMBT order is defined as follows: For any UAV n∈N and any two coalitional structures $SC_P$ and $SC_Q$ that are generated through the switch operation, where $A(n) = \{A_n \in SC | A_m^{(n)} \ne \emptyset, m \in M\}$ represents a set of other task point coalitions to which the UAV n allocates resources, $$SC_Q \succ_n SC_P \Leftrightarrow$$

$$u_n(SC_Q) + \sum_{g \in Mem(\mathcal{A}_j) \setminus \{n\}} [u_g(SC_Q) - u_g(SC_P)] + \sum_{o \in Mem(\mathcal{A}(n)) \setminus \{n\}} u_o(SC_Q) >$$

-continued $$u_n(SC_P) + \sum_{h \in Mem(\mathcal{A}_j) \setminus \{n\}} [u_h(SC_P) - u_h(SC_Q)] + \sum_{o \in Mem(\mathcal{A}(n)) \setminus \{n\}} u_o(SC_P);$$

and when the UAV n performs a resource switch operation, a proposed preference decision indicates that total coalitional utility containing utility of the UAV n and utility of a resource transfer coalition is greater than that before resource transfer. When this condition is satisfied, the switch operation is successful; otherwise, the switch operation fails.

Step 3: Optimize the task resource allocation of the UAV under the overlapping coalitional structure by using a preference gravity-guided Tabu Search algorithm based on a preference relationship between the UAV and tasks with a same type of resource, to form a stable coalitional structure.

Firstly, a resource allocation vector of the UAV n for the $m^{th}$ task point in a $k^{th}$ iteration is defined as $A_m^{(n)} = \{\tau_{n,m}^{(1)}(k), \ldots, \tau_{n,m}^{(z_b)}(k), \ldots, \varepsilon_{n,m}^{(z_c)}(k), \ldots, \varepsilon_{n,m}^{(Z)}(k)\}$, and a coalitional structure $SC^{(k)} = \{A_1^{(k)}, \ldots, A_m^{(k)}\}$ under resource allocation in the $k^{th}$ iteration is obtained. A Tabu list $Tabu_{SC} = \{SC^{(k-L_{tabu})}, \ldots, SC^{(k-1)}\}$ is established based on resource allocation under a historical coalitional structure, where $L_{tabu}$ represents a Tabu length, indicating existence time of the coalitional structure in the Tabu list. It should be noted that the UAV cannot perform a switch operation for resource allocation, which generates a coalitional structure that is the same as a coalitional structure in the Tabu list. Secondly, the Tabu Search algorithm is sensitive to an initial solution, such that a better initial solution can improve a convergence speed of the algorithm and quality of a final solution. To guide the UAV to search for an appropriate resource allocation decision, a concept of preference gravity is introduced based on tasks of remaining unallocated resources and UAVs of remaining unused resources. A vector of a remaining resource required by the $m^{th}$ task point is defined as $L_m^{(less)}(k) = \{Le_m^{(1)}(k), \ldots, Le_m^{(z_b)}(k), \ldots, Re_m^{(z_c)}(k), \ldots, Re_m^{(Z)}(k)\}$, where $Le_m^{(z_b)}(k)$ and $Re_m^{(z_c)}(k)$ are expressed as follows:

$$Le_m^{(z_b)}(k) = \max\left\{0, l_m^{(z_b)} - \sum_{n \in N} \tau_{n,m}^{(z_b)}(k)\right\}$$

$$Re_m^{(z_c)}(k) = \max\left\{0, \xi_m^{(z_c)} - \sum_{n \in N} \varepsilon_{n,m}^{(z_c)}(k)\right\}$$

$Le_m^{(z_b)}(k)$ and $Re_m^{(z_c)}(k)$ vary with a UAV resource allocation decision. The preference gravity may be regarded as a degree of preference between a remaining resource required by the task point and a remaining resource carried by the UAV. A preference gravity vector of a $z^{th}$ type of resource of the UAV n for each task is defined as $F_n^{(z)}(k) = [f_{1,n}^{(z)}(k), \ldots, f_{m,n}^{(z)}(k)]$, where $f_{m,n}^{(z)}(k)$ represents preference gravity for the $m^{th}$ task point, and is expressed as follows:

$$f_{m,n}^{(z)}(k) = \begin{cases} \dfrac{(\beta_m)^2 Le_m^{(z_b)}(k) \delta_n^{(z_b)}}{d_{m,n}}, & \text{when } z = z_b; \\ \dfrac{(\beta_m)^2 Re_m^{(z_c)}(k) \mu_n^{(z_c)}}{d_{m,n}}, & \text{when } z = z_c. \end{cases}$$

A probability vector of the $z^{th}$ type of resource $\delta_n^{(z)}$ of the $n^{th}$ UAV for being allocated to each task is defined as $P_n^{(z)}(k)=[p_{n,1}^{(z)}(k), \ldots, p_{m,n}^{(z)}(k), \ldots, p_{n,M}^{(z)}(k)]$, and is expressed as follows:

$$p_{m,n}^{(z)}(k) = \frac{\exp[f_{m,n}^{(z)}(k)\Gamma(k)]}{\sum_{m \in M} \exp[f_{m,n}^{(z)}(k)\Gamma(k)]}.$$

where $\Gamma(k)$ represents the Boltzmann coefficient. The UAV performs a switch operation according to a selection probability established based on the preference gravity. If proposed priority is satisfied, the UAV performs a switch operation of resource allocation to improve the total task execution utility of the network; otherwise, the UAV maintains the original coalitional structure under the resource allocation. A specific algorithm process is as follows:

a) Initialization: Set a quantity k of iterations to 0, namely, k=0. A coalitional structure under resource allocation in each iteration is denoted as $SC^{(k)}=\{A_1^{(k)}, \ldots, A_m^{(k)}\}$, a Tabu list $Tabu_{SC}=\{SC^{(k-L_{tabu})}, \ldots, SC^{(k-1)}\}$ is established and initialized to empty, and a Tabu length is set as $L_{tabu}$. A remaining initially-carried resource $L_m^{(less)}(0)$ is input to obtain $F_m^{(z)}(0)$ and $P_n^{(z)}(0)$. An initially carried resource of the UAV is allocated to each task point based on $P_n^{(z)}(0)$, and step b), step c), and step d) are performed cyclically.

b) Set k=k+1. A vector $L_m^{(less)}(k)$ and the Tabu list $Tabu_{SC}$ are updated based on a coalitional structure $SC^{(k-1)}$. The Boltzmann coefficient is updated according to a rule $\Gamma(k+1)=\Gamma(k)+k(\Gamma_{max}-\Gamma(k))/K_{max}$.

c) Some consumable UAV resources $\delta_n^{(zb)}$ or non-consumable resources $\mu_n^{(zc)}$ are randomly selected, and $\delta_n^{(zb)}$ or $\mu_n^{(zc)}$, and $L_m^{(less)}(k)$ are input into a preference gravity expression to obtain $P_n^{(z)}(k)$. Then, the UAV n performs a switch operation based on the vector $P_n^{(z)}(k)$. A coalitional structure obtained after the switch operation is $SC_{switch}^{(k)}$. If the new coalitional structure $SC_{switch}^{(k)}$ is different from any one in the Tabu list $Tabu_{SC}$, step d) is performed; otherwise, step b) is performed.

d) The UAV n updates the coalitional structure according to the following order:

$$SC^{(k)} = \begin{cases} SC_{switch}^{(k)}, & \text{if } SC_{switch}^{(k)} \succ_n SC^{(k-1)} \\ SC^{(k-1)}, & \text{else} \end{cases}$$

e) End the process when the utility is still not improved after $K_{stable}$ iterations are performed or a total quantity of iterations reaches $K_{max}$, to obtain a final convergence structure $SC^{(*)}$.

Simulation analysis is performed by using simulation parameters in Table 1.

TABLE 1

Simulation parameters

| Parameter | Value |
| --- | --- |
| Required task completion time | $t_m^{(com)} \in (50 - 120), \forall m \in M$ |
| Maximum flight speed of a UAV (m/s) | $v_n \in (6 - 22), \forall n \in N$ |
| Time consumption consumption weight coefficient | $\omega_2/\omega_1 = (0.01 - 0.04)$ |
| Energy consumption weight coefficient | $\omega_3/\omega_1 = (0.01 - 0.04)$ |
| Boltzmann coefficient | $\Gamma_{max} = 2$ |
| Blade profile power | $p_n = 0.2$ W, $\forall n \in N$ |

TABLE 1-continued

Simulation parameters

| Parameter | Value |
| --- | --- |
| Fuselage drag ratio | $f_0 = 0.3$ |
| Air density | $\rho = 1.125$ |
| Mean rotor velocity | $v_0 = 200$ m/s |
| Tip speed of a rotor | $U_{tip} = 7.3$ m/s |

Figure 3:
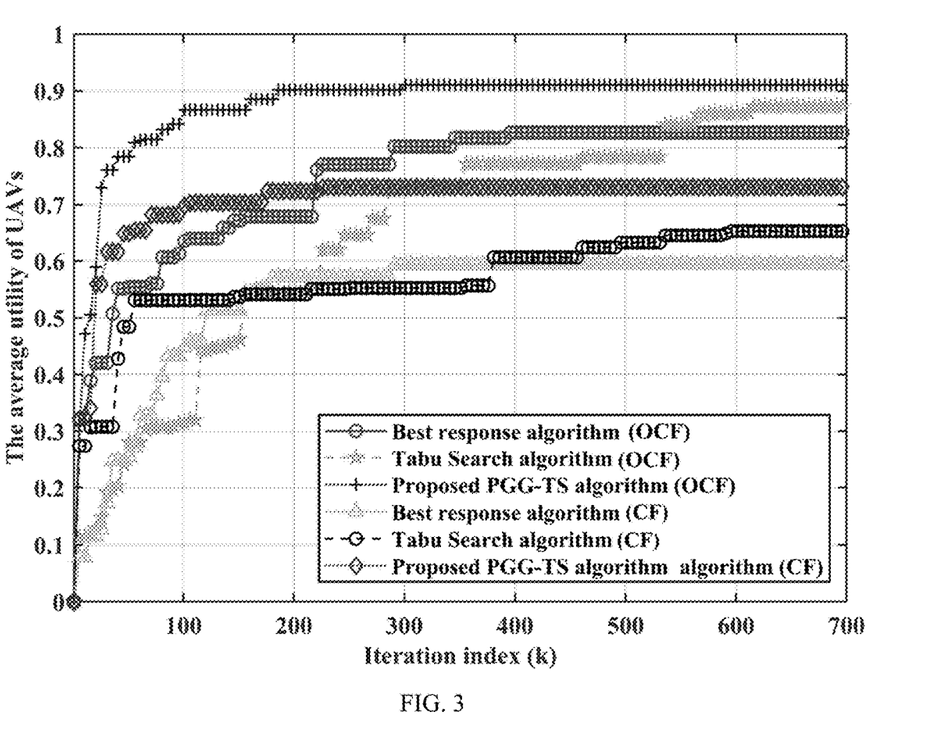
FIG. 3 shows utility convergence curves of various algorithms under different coalition models.

As shown in FIG. 3, a convergence speed and total network utility of the proposed preference gravity-guided Tabu search algorithm are higher than those of other algorithms. This verifies effectiveness of the proposed algorithm. A reason is that the setting of the preference gravity can guide the UAV to converge to a better coalitional structure. The proposed OCF scheme can make the UAV to form a more flexible resource allocation coalition structure. Therefore, with only a few extra iterations, the OCF game scheme generates higher network utility than the CF game scheme.

Figure 4:
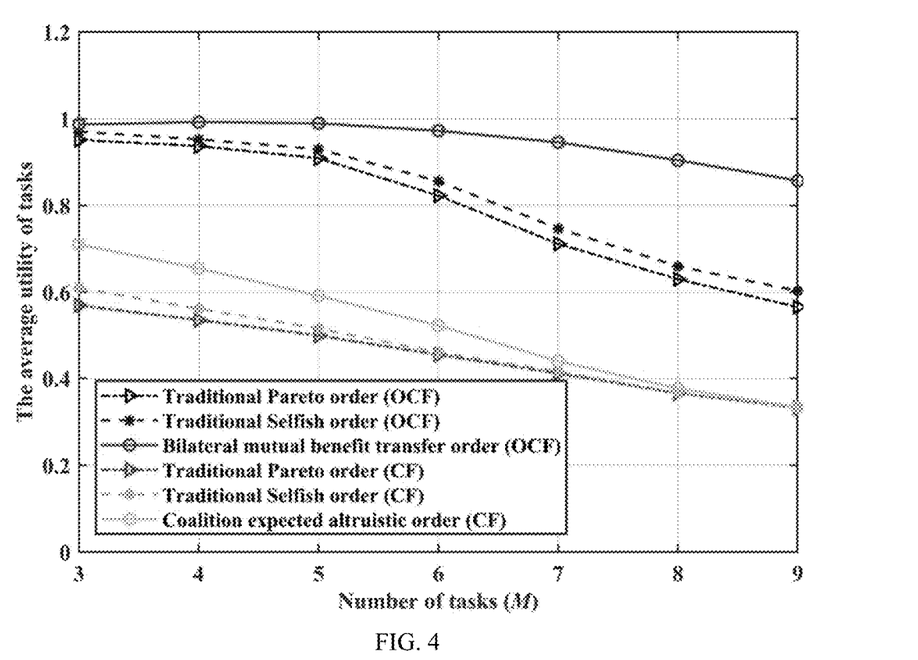
FIG. 4 shows a curve in which average execution utility of task points varies with a quantity of UAVs.

FIG. 4 shows average utility of task points under different preference criteria as a quantity of UAVs increases when there are five tasks. First, the average utility of the task points increases as the quantity of UAVs increases. Furthermore, the task execution utility achieved based on the proposed BMBT order is obviously higher than that achieved based on a traditional Pareto order or selfish order. In the proposed BMBT order, each UAV plays more attention to cooperation in its own partially overlapping coalition, to improve the total utility of the network.

To sum up, the existing CF game model usually assumes that different UAVs execute tasks separately, does not consider a cooperation relationship between heterogeneous UAVs, and only optimizes a composition structure of UAVs in a coalition.

In view of this, considering the overlapping and complementary relationship between the resource properties of the UAV and the task and the task priority, the present invention provides the sequential OCF game model to quantify the characteristics of the resource properties of the UAV and the task, and optimize the task resource allocation of the UAV under the overlapping coalitional structure. In addition, the present invention provides a BMBT order maximizing a revenue of a UAV, to further prove that the OCF game under the BMBT order is an extract potential game. Then, the stability of the overlapping coalitional structure is ensured through Nash equilibrium (NE). Based on the preference relationship between the UAV and the tasks with the same type of resource, the present invention provides the preference gravity-guided Tabu search algorithm to obtain the stable coalitional structure. The proposed OCF game scheme based on the preference gravity-guided Tabu search algorithm in the present invention is superior to a non-overlapping CF game scheme. In addition, the proposed BMBT order is superior to other criteria.

The above described are only preferred implementations of the present invention, and the protection scope of the present invention is not limited to the above embodiments. All technical solutions based on the idea of the present invention should fall within the protection scope of the present invention. It should be noted that several modifications and adaptations made by those of ordinary skill in the art without departing from the principle of the present invention should fall within the protection scope of protection of the present invention.

What is claimed is:

1. An unmanned aerial vehicle (UAV) task cooperation method based on an overlapping coalition formation (OCF) game, comprising:

step 1: considering an overlapping and complementary relationship between resource properties of a UAV and a task and a task priority, quantifying characteristics of the resource properties of the UAV and the task, optimizing task resource allocation of the UAV under an overlapping coalitional structure, and constructing a sequential OCF game model for a UAV multi-task cooperation problem;

step 2: using a bilateral mutual benefit transfer (BMBT) order that is biased toward utility of a whole coalition to evaluate a preference of the UAV for the overlapping coalitional structure, wherein all coalition members cooperate with each other to achieve mutual benefits and further improve total task execution utility of a whole network;

step 3: optimizing the task resource allocation of the UAV under the overlapping coalitional structure by using a preference gravity-guided Tabu Search algorithm based on a preference relationship between the UAV and tasks with a same type of resource to form a stable coalitional structure;

step 4: optimizing a transmission strategy based on a current coalitional structure, an updated status of a task resource allocation scheme of the UAV, and a current fading environment, to maximize the task execution utility of the UAV network; and step 5: performing, by the UAV, the task according to the optimized task resource allocation and the optimized transmission strategy;

wherein in step 1, the sequential OCF game model is constructed for the UAV multi-task cooperation problem; and in the sequential OCF game model, the UAV serves as a player and is assumed to allocate a resource and form an overlapping coalition to cooperatively complete the task, wherein a quantity of coalitions is equal to a quantity of tasks;

a task cooperation model based on the OCF game is defined as $\mathcal{G} = \{N, U_m, SC, X\}$, wherein N represents a UAV player; $U_m$ represents a utility function of a task point coalition m; $SC=\{A_1, \ldots, A_m\}$, $Mem(A_m) \in N$ represents the overlapping coalitional structure; $Mem(A_m)$ represents a coalition member set of UAVs that allocate resources to an $m^{th}$ task point and is expressed as $Mem(A_m)=\{n \in N | A_m^{(n)} \neq \emptyset\}$; and $X=\{x_1, \ldots, x_n, \ldots, x_N\}$ represents a UAV decision-making vector for determining the task resource allocation, and a resource allocation vector of each UAV is defined as $X_n=[A_1^{(n)}, \ldots, A_m^{(n)}, \ldots, A_m^{(n)}]$; and each UAV gets a share of a revenue from a coalition that the UAV joins, a revenue sharing problem is resolved according to basic proportional fairness of a Shapley value, and utility of a UAV n is expressed as follows:

$$u_n = \sum_{m \in M} \mho_n^{(m)} U_m(\mathcal{A}_m)$$

wherein $\mho_n^{(m)}$ represents a proportion of UAV resource allocation for the task point coalition m to guarantee that a utility back deserved by the UAV from the coalition increases as the task resources of the UAV allocated to the coalition increases, and $\mho_n^{(m)}$ is expressed as follows:

$$\mho_n^{(m)} = \frac{O_n^{(m)}}{\sum_{n \in Mem(A_m)} O_n^{(m)}}$$

wherein $O_n^{(m)}$ represents an amount of resources allocation of the UAV n to the task point coalition m, and $O_n^{(m)}$ is expressed as follows:

$$O_n^{(m)} = \sum_{\substack{(z_b)(z_c) \\ \tau_{n,m}^{(z_b)}, \varepsilon_{n,m}^{(z_c)} \in A_m^{(n)}}} \left( |\tau_{n,m}^{(z_b)}| + |\varepsilon_{n,m}^{(z_c)}| \right);$$

wherein in the sequential OCF game model in step 1, for a UAV player n, two coalitional structures $SC_Q$ and $SC_P$ are provided, and the coalitional structure $SC_Q$ is superior to the coalitional structure $SC_P$, which is expressed as $SC_Q \succ_n SC_P$;

$SC_Q \succ_n SC_P$ indicates that the UAV player n prefers to allocate the task resources by using the coalitional structure $SC_Q$ instead of the coalitional structure $SC_P$;

a coalitional structure $SC_P=\{A_1^{(p)}, \ldots, A_m^{(p)}\}$ is considered, wherein for some resources $\delta_n^{(z_b)}$ of the UAV player n, $|\delta_n^{(z_b)}| \leq |\tau_n^{(z_b)}|$ is satisfied;

a switch operation is defined as an action of moving some consumable resources from a coalition $A_i^{(p)}$ to a coalition $A_j^{(p)}$ to generate a new coalitional structure $SC_Q=SC_P \setminus \{A_i^{(p)}, A_j^{(p)}\} \cup \{A_i^{(q)}, A_j^{(q)}\}$, wherein $A_i^{(q)} = A_i^{(p)} \setminus \{\delta_n^{(z_b)}\}$ and $A_j^{(q)} = A_j^{(p)} \cup \{\delta_n^{(z_b)}\}$; and for a non-consumable resource $\mu_n^{(z_c)}$, the switch operation is defined as an action of leaving or joining the coalition $A_i^{(p)}$ to generate a new coalitional structure $SC_Q=SC_P \setminus \{A_i^{(p)}\} \cup \{A_i^{(q)}\}$, wherein $A_i^{(q)}=A_i^{(p)} \setminus \{\mu_n^{(z_c)}\}$ or $A_j^{(p)} \cup \{\mu_n^{(z_c)}\}$, and the two coalitional structures obtained after the switch operation need to satisfy a preference decision, namely, $SC_Q \succ_n SC_P$;

wherein the BMBT order in step 2 is specifically as follows:

for any UAV $n \in N$ and any two coalitional structures $SC_P$ and $SC_Q$ that are generated through a switch operation, wherein $A(n)=\{A_n \in SC | A_m^{(n)} \neq \emptyset, m \in M\}$ represents a set of other task point coalitions to which the UAV n allocates resources, $$SC_Q \succ_u SC_P \Leftrightarrow u_n(SC_Q) + \sum_{g \in Mem(A_j):\{n\}} [u_g(SC_Q) - u_g(SC_P)] +$$

$$\sum_{a \in Mem(A(n)) \setminus \{n\}} u_o(SC_Q)$$

$$> u_n(SC_P) + \sum_{h \in Mem(A_j)\gamma,\{n\}} [u_h(SC_P) - u_h(SC_Q)] +$$

$$\sum_{n \in Mem(A(n)) \setminus \{n\}} u_o(SC_P);$$

and when the UAV n performs a resource switch operation, a proposed preference decision indicates that total coalitional utility containing utility of the UAV n and utility of a resource transfer coalition is greater than that before resource transfer; and when this condition is satisfied, the switch operation is successful; otherwise, the switch operation fails;

wherein the step of optimizing the task resource allocation of the UAV under the overlapping coalitional structure by using the preference gravity-guided Tabu Search algorithm based on the preference relationship between the UAV and tasks with the same type of resource to form the stable coalitional structure in step 3 specifically comprises:

defining a resource allocation vector of a UAV n for an $m^{th}$ task point in a $k^{th}$ iteration as $A_{m}^{(n)}=\{\tau_{n,m}^{(1)}(k), \ldots, \tau_{n,m}^{(z_b)}(k), \ldots, \varepsilon_{n,m}^{(z_c)}(k), \ldots, \varepsilon_{n,m}^{(Z)}(k)\}$, and obtaining a coalitional structure $SC^{(k)}=\{A_1^{(k)}, \ldots, A_m^{(k)}\}$ under resource allocation in the $k^{th}$ iteration;

establishing a Tabu list $Tabu_{SC}=\{SC^{(k-L_{tabu})}, \ldots, SC^{(k-1)}\}$ based on resource allocation under a historical coalitional structure, wherein $L_{tabu}$ represents a Tabu length, indicating existence time of the coalitional structure in the Tabu list;

introducing a concept of preference gravity based on tasks of remaining unallocated resources and UAVs of remaining unused resources, and defining a vector of a remaining resource required by the $m^{th}$ task point as $L_m^{(less)}(k)=\{Le_m^{(1)}(k), \ldots, Le_m^{(z_b)}(k), \ldots, Re_m^{(z_c)}(k), \ldots, Re_m^{(Z)}(k)\}$, wherein $Le_m^{(z_b)}(k)$ and $Re_m^{(z_c)}(k)$ are expressed as follows:

$$Le_m^{(z_b)}(k) = \max\left\{0, l_m^{(z_b)} - \sum_{n \in N} \tau_{n,m}^{(z_b)}(k)\right\}$$

$$Re_m^{(z_c)}(k) = \max\left\{0, \xi_m^{(z_c)} - \sum_{n \in N} \varepsilon_{n,m}^{(z_c)}(k)\right\}$$

wherein $Le_m^{(z_b)}(k)$ and $Re_m^{(z_c)}(k)$ vary with a UAV resource allocation decision;

defining the preference gravity as a degree of preference between the remaining resource required by the task point and a remaining resource carried by the UAV;

defining a preference gravity vector of a $z^{th}$ type of resource of the UAV n for each task as follows:
$F_n^{(z)}(k)=[f_{1,n}^{(z)}(k), \ldots, f_{m,n}^{(z)}(k)]$, wherein $f_{m,n}^{(z)}(k)$ represents preference gravity for the $m^{th}$ task point, and $f_{m,n}^{(z)}(k)$ is expressed as follows:

$$f_{m,n}^{(z)}(k) = \begin{cases} \dfrac{(\beta_m)^2 Le_m^{(z_b)}(k)\delta_n^{(z_b)}}{d_{m,n}}, & \text{when } z = z_b; \\ \dfrac{(\beta_m)^2 Re_m^{(z_c)}(k)\mu_n^{(z_c)}}{d_{m,n}}, & \text{when } z = z_c \end{cases}$$

and defining a probability vector of the $z^{th}$ type of resource $\delta_n^{(z)}$ of the UAV n for being allocated to each task, namely, $P_n^{(z)}(k)=[p_{n,1}^{(z)}(k), \ldots, p_{m,n}^{(z)}(k), \ldots, p_{n,M}^{(z)}(k)]$, wherein a corresponding expression is as follows:

$$p_{m,n}^{(z)}(k) = \frac{\exp[f_{m,n}^{(z)}(k)\Gamma(k)]}{\sum_{m \in M} \exp[f_{m,n}^{(z)}(k)\Gamma(k)]}$$

wherein $\Gamma(k)$ represents a Boltzmann coefficient; the UAV performs a switch operation according to a selection probability established based on the preference gravity; and when proposed priority is satisfied, the UAV performs a switch operation of resource allocation to improve the total task execution utility of the network; otherwise, the UAV maintains the original coalitional structure under the resource allocation;

wherein step 3 specifically comprises the following substeps:

a) initialization: setting a quantity k of iterations to 0, namely k=0, denoting a coalitional structure under resource allocation in each iteration as $SC^{(k)}=\{A_l^{(k)}, \ldots, A_m^{(k)}\}$, establishing a Tabu list $Tabu_{SC}=\{SC^{(k-L_{tabu})}, \ldots, SC^{(k-1)}\}$, initializing the Tabu list to empty, setting a Tabu length as $L_{tabu}$, and inputting a remaining initially-carried resource $L_m^{(less)}(0)$ to obtain $F_n^{(z)}(0)$ and $P_n^{(z)}(0)$; and allocating an initially carried resource of the UAV to each task point based on $P_n^{(z)}(0)$, and performing step b), step c), and step d) cyclically;

b) setting k=k+1, updating a vector $L_m^{(less)}(k)$ and the Tabu list $Tabu_{SC}$ based on a coalitional structure $SC^{(k-1)}$, and updating the Boltzmann coefficient according to a rule $\Gamma(k+1)=\Gamma(k)+k(\Gamma_{max}-\Gamma(k))/K_{max}$;

c) randomly selecting some consumable UAV resources $\delta_n^{(z_b)}$ or non-consumable resources $\mu_n^{(z_c)}$, inputting $\delta_n^{(z_b)}$ or $\mu_n^{(z_c)}$, and $L_m^{(less)}(k)$ into a preference gravity expression to obtain $P_n^{(z)}(k)$, and performing, by a UAV n, a switch operation based on the vector $P_n^{(z)}(k)$, wherein a coalitional structure obtained after the switch operation is $SC_{switch}^{(k)}$; and when the new coalitional structure $SC_{switch}^{(k)}$ is different from any one in the Tabu list $Tabu_{SC}$, performing step d), otherwise, performing step b);

d) updating, by the UAV n, the coalitional structure according to the following order:

$$SC^{(k)} = \begin{cases} SC_{swicth}^{(k)}, & \text{if } SC_{swicth}^{(k)} >_n SC^{(k-1)} \\ SC^{(k-1)}, & \text{else} \end{cases};$$

and e) ending the process when the utility is still not improved after $K_{stable}$ iterations are performed or a total quantity of iterations reaches $K_{max}$, to obtain a final convergence structure $SC^{(*)}$.

* * * * *